US008220832B2

(12) United States Patent
Müller

(10) Patent No.: US 8,220,832 B2
(45) Date of Patent: Jul. 17, 2012

(54) AIRBAG SYSTEM, VEHICLE SEAT COMPRISING AN AIRBAG SYSTEM, AND DEPLOYMENT FOR AN AIRBAG SYSTEM

(75) Inventor: Helmut Müller, Rüsselsheim (DE)

(73) Assignee: Inova GmbH Technische Entwicklungen, Russelsheim (DE)

( * ) Notice: Subject to any disclaimer, the term of this patent is extended or adjusted under 35 U.S.C. 154(b) by 307 days.

(21) Appl. No.: 12/525,679

(22) PCT Filed: Feb. 7, 2008

(86) PCT No.: PCT/DE2008/000238
§ 371 (c)(1),
(2), (4) Date: Sep. 24, 2009

(87) PCT Pub. No.: WO2008/095485
PCT Pub. Date: Aug. 14, 2008

(65) Prior Publication Data
US 2010/0013199 A1   Jan. 21, 2010

(30) Foreign Application Priority Data

Feb. 7, 2007 (DE) ............... 20 2007 002 038 U
Feb. 21, 2007 (DE) ............... 20 2007 002 716 U

(51) Int. Cl.
*B60R 21/207* (2006.01)
(52) U.S. Cl. .................. 280/730.2; 280/743.2
(58) Field of Classification Search ............... 280/728.2, 280/728.3, 730.2, 743.2
See application file for complete search history.

(56) References Cited

U.S. PATENT DOCUMENTS

| 5,222,932 | A | * | 6/1993 | Fontecchio ............... 493/210 |
| 5,630,616 | A | * | 5/1997 | McPherson ............... 280/730.2 |
| 5,810,389 | A |   | 9/1998 | Yamaji et al. |
| 5,938,232 | A | * | 8/1999 | Kalandek et al. ......... 280/730.2 |
| 6,206,410 | B1 |  | 3/2001 | Brown |

(Continued)

FOREIGN PATENT DOCUMENTS

DE  19860840 A1  9/1999

(Continued)

OTHER PUBLICATIONS

International Search Report mailed Jun. 19, 2008 for PCT/DE2008/000238 filed Feb. 7, 2008.

(Continued)

*Primary Examiner* — Joseph Rocca
(74) *Attorney, Agent, or Firm* — Martin Fleit; Paul D. Bianco; Fleit Gibbons Gutman Bongini & Bianco PL

(57) ABSTRACT

The invention relates to an airbag system comprising an airbag module, which has an opening mechanism for the airbag tear seam of a seat cover for the airbag accommodated underneath the cover in a non-visible manner, wherein the opening mechanism is configured such that the deploying force of the airbag tears a hole or holes into the tear seam, which bring(s) about a slight opening of the seam according to the physics of a 'run,' wherein a strip, or plurality of strips, or strip ends sewn into the airbag tear seam of the seat cover in more than one locations is/are torn from the seam driven by the deploying force of the airbag. The invention further relates to a vehicle seat comprising such an airbag system, and to a deployment method for such an airbag system.

20 Claims, 9 Drawing Sheets

U.S. PATENT DOCUMENTS

| | | |
|---|---|---|
| 6,299,197 B1 | 10/2001 | Mueller |
| 6,357,789 B1 * | 3/2002 | Harada et al. ............... 280/730.2 |
| 6,439,597 B1 * | 8/2002 | Harada et al. ............... 280/728.2 |
| 7,784,819 B2 * | 8/2010 | Lawall et al. ............... 280/728.3 |
| 7,954,842 B2 * | 6/2011 | Deppe et al. ............... 280/728.3 |
| 2007/0164545 A1 | 7/2007 | Muller |
| 2008/0258440 A1 | 10/2008 | Muller |
| 2009/0051148 A1 * | 2/2009 | Osterhout ............... 280/728.3 |
| 2010/0173137 A1 * | 7/2010 | Kismir et al. ............... 428/196 |

FOREIGN PATENT DOCUMENTS

| | | |
|---|---|---|
| EP | 0782944 A1 | 7/1997 |
| EP | 1069004 A2 | 1/2001 |
| JP | 09071205 A | 3/1997 |
| JP | 10310017 A | 11/1998 |
| WO | 2005102789 A1 | 11/2005 |
| WO | 2007042011 A2 | 4/2007 |

OTHER PUBLICATIONS

English translation of the International Preliminary Report on Patentability published Oct. 13, 2009 for PCT/DE2008/000238 filed Feb. 7, 2008.

English translation of the Written Opinion published Oct. 12, 2009 for PCT/DE2008/000238 filed Feb. 7, 2008.

* cited by examiner

AIRBAG SYSTEM, VEHICLE SEAT COMPRISING AN AIRBAG SYSTEM, AND DEPLOYMENT FOR AN AIRBAG SYSTEM

FIELD Of THE INVENTION

The invention relates to an airbag system, to a vehicle seat with an airbag system, and also to a deployment method for an airbag system.

The application of the invention relates to land, air, and water vehicles, even when a vehicle seat of a motor vehicle is referenced below as an example. Primarily automobile seats as indicated above, but also seats in other types of vehicles, are obtaining and including an increasing number of safety devices and functions. In particular, thorax airbags are being integrated into such seats as an airbag system.

BACKGROUND OF THE INVENTION

Based on the principles of the technology according to the patent application DE 198 60 840 A1 and the parallel U.S. Pat. No. 6,299,197, as well as the PCT Application No. PCT/DE 2005/000765, each from the same original applicant on the subject of "run openings" in airbags that are covered with sewn textile or the like, the present invention concerns extensions and additional alternatives to the PCT Application No. PCT/DE 2006/001796, likewise from the same original applicant, concerning, in particular, secure assembly, especially of the tear strip, during mass production and the effect thereof on the entire system, and further improved implementations for the safe discharge of an airbag through a seat covering. In this respect, the total contents of disclosure of these older applications, especially with respect to the structural type of the airbag device and its assembly and operating method, are incorporated in full through reference herewith in the present document to avoid repetition.

In summary, the preceding applications named above show a tearing means, for example, a strip, a thread, or the like, which is sewn with a passage seam for the airbag provided. Through various kinds of "direction changes," the tearing means/strip is mounted so that, at the beginning of its deployment, the airbag generates a load that tears a run or a hole in the planned tear seam with the tearing means. Thereafter, the further-deploying airbag is easily able to continue opening the tear seam. The system functions better than all other systems and, as a result, is independent of the type of seam and quality of the material.

Techniques that are typically used today use different ways to solve the problem of seams that open with difficulty. The seams are weakened and require, in connection with expansion-soft materials, low-expansion sleeves that are also sewn: this is all very production-sensitive and material-sensitive. Expensive monitoring tests are necessary.

The present invention has and achieves the goal of further improving the known, earlier technology through refinements and alternatives.

SUMMARY OF THE INVENTION

The invention thus devises an airbag system with an airbag module, wherein an opening technique of the airbag tear seam of a seat covering is created for the not-visible airbag housed under the covering. This opening technique is designed such that the deploying force of the airbag tears a hole or holes in the tear seam, wherein this hole or these holes creates/create a slight opening in the seam according to the physics of a "run." This is achieved according to the invention in that one or more strips or strip ends sewn in the airbag tear seam of the seat covering is or are torn from the seam and, indeed, driven by the deploying force of the airbag. The specific embodiment here tears, for example, the strip sewn, e.g., at two points, into two holes accordingly, which is especially advantageous for a "double" so-called pelvis-thorax bag. Thus, the strip/strips is/are sewn at more than one point.

Advantageously, the bend [sic; strip] end is or the strip ends are one side of a loop that is placed around the airbag module.

Furthermore, advantageously it can be provided that the strip loop is provided at the end with a sliding ring through which the strip to be torn or the strip ends to be torn is/are passed.

In another implementation, the strip end is or the strip ends are positioned so that the strip end/strip ends are "peeled away." Here, less force is needed than for "clean break" tearing.

Another preferred implementation is that the airbag fold(s) is/are configured such that force of the first deployment is tailored to the opening of the tear strip. This could be refined such that the airbag fold(s) is/are configured such that a target deployment direction and velocity is realized.

Yet another preferred implementation consists in that a tear strip opening system is configured such that an "open" sleeve is set around the airbag module and one side of this sleeve is cut into one or more tear strips. This can be refined advantageously whereby the tear strip opening system is configured such that holes are formed on the opposite side of the open sleeve and the tear strips pass through these holes from the opposite side.

It can be further advantageously provided that a or the tear strip opening system is configured such that the tear strips are sewn with the airbag tear seam. Alternatively or additionally, the tear strip opening system could be advantageously configured in its function such that, the tear strips are stressed during the deployment of the airbag, and thus the holes in the tear seam tear for the purpose of quick and low-force discharge of the airbag.

Furthermore, a vehicle seat with such an airbag system and deployment method for such an airbag system is designed by the invention. Furthermore, the invention devises suitable deployment methods for such an airbag system.

Preferred and/or advantageous implementations of the invention emerge from the claims and combinations thereof, as well as from all of the present application documents.

BRIEF DESCRIPTION OF THE DRAWINGS

The invention will be explained in greater detail using embodiments below with reference to the drawings merely as examples, in which.

DETAILED DESCRIPTION OF THE INVENTION

Figure 1:
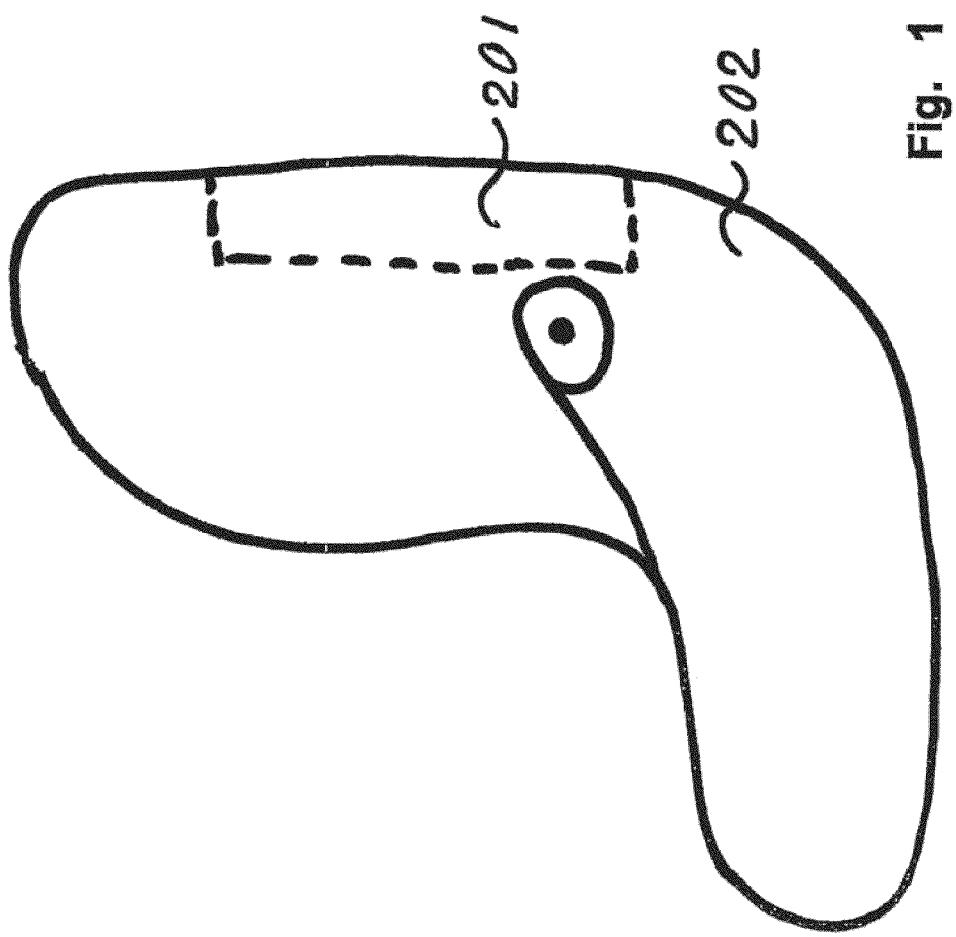
FIG. 1 shows, in a schematic side view, an airbag of an embodiment of the invention.

With reference to the implementations and embodiments described below and shown in the drawings, examples are used merely to explain the invention, i.e., the invention is not limited to these implementations and embodiments or to the corresponding combinations of features within individual implementations and embodiments. Features for methods and devices also emerge analogously from descriptions of devices and methods.

Individual features that are specified and/or shown in connection with actual embodiments are not limited to these embodiments or to the combination with the other features of these embodiments, but instead could be combined, within the scope of technical know-how, with any other variants, even if they are not treated separately in the present documents.

The same reference numerals in the individual figures and diagrams of the drawings designate components that are the same or similar or that act in the same or similar ways. With reference to the representations in the drawings, those features not provided with reference numerals will also become clear, regardless of whether these features are described below. On the other hand, features that are included in the present description but that are not visible or not shown in the drawings will also be easily understandable for someone skilled in the art.

Furthermore, the list of reference numerals at the end of this description is an explicit component of this description.

FIG. 1 shows a two-chamber bag 201 increasingly expanding with a lower bag 202 for stronger support at the pelvis with more pressure. It is also advantageous that the lower bag 202 discharges early. As is known, a human is widest at the pelvis and the most common entrance of an impacting force is at the bottom.

Figure 2:
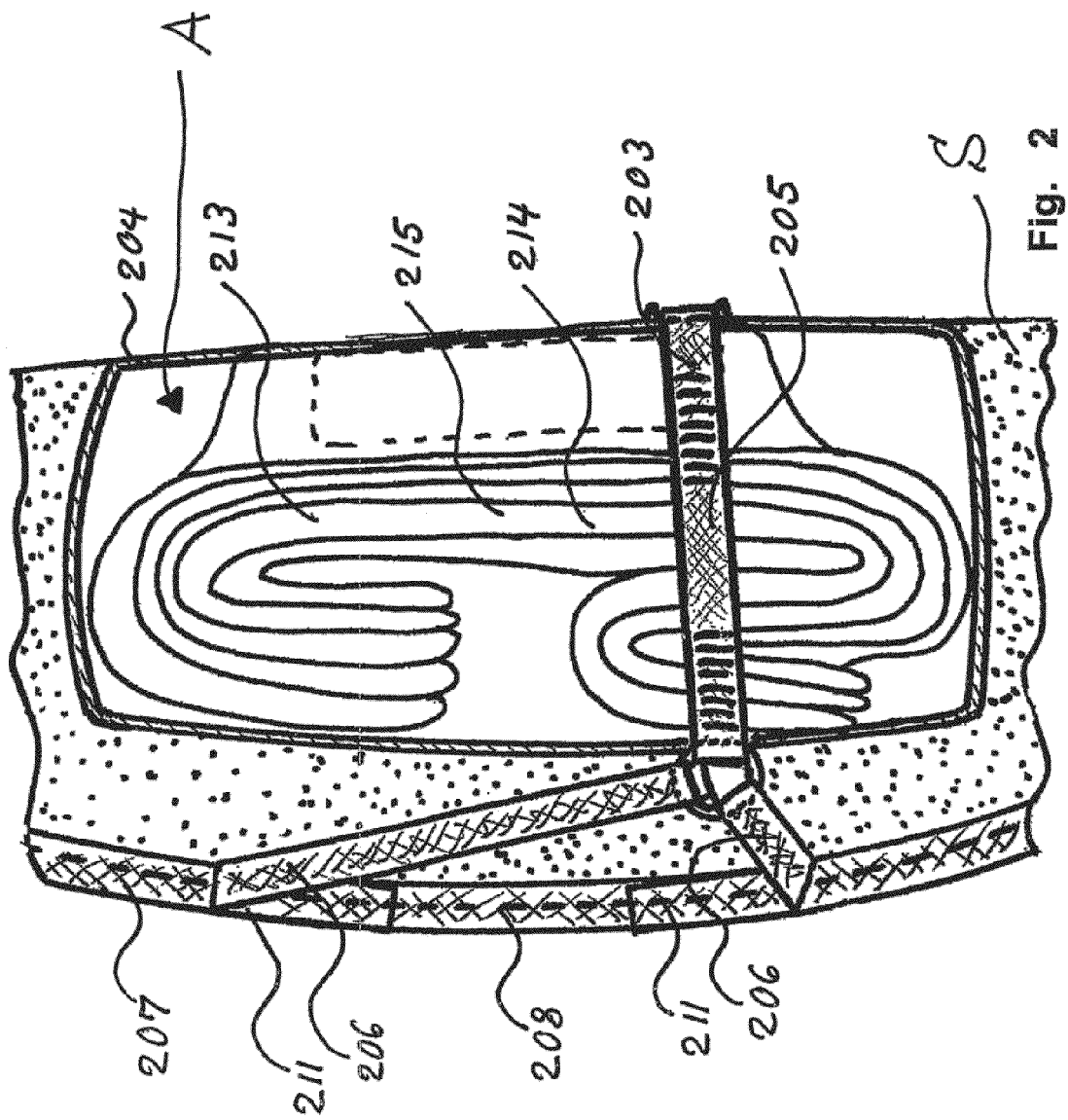
FIG. 2 shows, in a schematic, partially sectioned side view, an embodiment of a vehicle seat with an airbag module of an airbag system of the invention.
Figure 3:
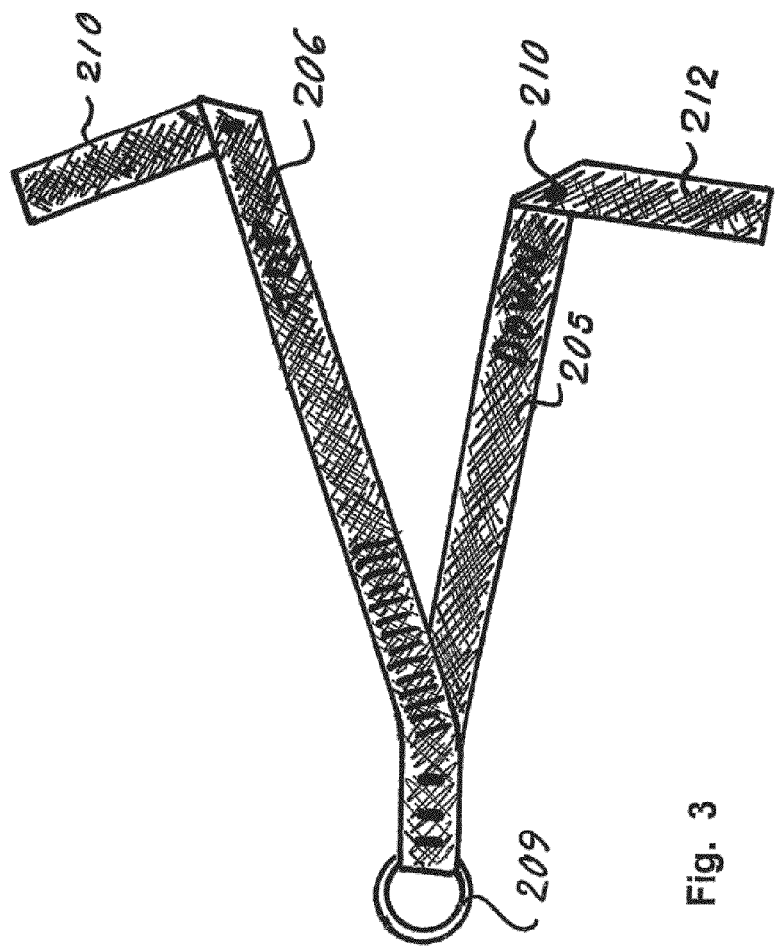
FIG. 3 shows, in a schematic view, an embodiment of a tear strip of an airbag system of the invention.

In order to be able to discharge this lower bag 202 as quickly as possible, a tear strip loop 203, as also shown and explained in numerous embodiments even in the older applications named above, is placed around the two-chamber bag 201 that has been folded together or around its container 204 as shown in FIG. 2 in the sectioned, schematic, and partially opened representation of a back rest part of a seat S. This two-chamber bag or its container is also designated representatively by the airbag module A. As shown in FIG. 3, the strip 205 is divided into two legs 206 that are sewn, as shown in FIG. 2, to a tear seam 208 on the seat covering 207 at the points at which the halves of the two-chamber bag 201 are to be discharged. Obviously, the two-chamber bag 201 could also be a one-chamber bag (not shown) that could be discharged more quickly by means of this technique.

For a good, smooth directional change of the legs 206 of the strip 205, a direction change ring 209, as shown in FIG. 3, is placed between the two legs 206 of the strip 205. Through this arrangement, no pre-assembly sewing of the strip 205 is required.

The strip 205 is, e.g., welded or joined using other common techniques to the direction change ring and the bends 210 as a pre-assembly.

The sewing 211 is configured, as shown in FIG. 2, so that the strip ends 212 are peeled away. In this way, the tear seam 208 is torn more easily and thus more quickly.

The airbag system can be further optimized whereby airbag 214 obtains a special fold 213. A basic fold 215 is bent at the top and bottom 180°, in order to store the gas centrally, so that the airbag 214 action first is concentrated on the tear strip loop 203 and is then discharged forwards.

The lower bag 202 is bent downward again 180°. Tests have shown that in this way the lower bag 202 unfolds downward at an angle. This is advantageous for reduction of the aggressiveness of the deployment that results due to a premature wide deployment in the vertical direction.

Figure 4:
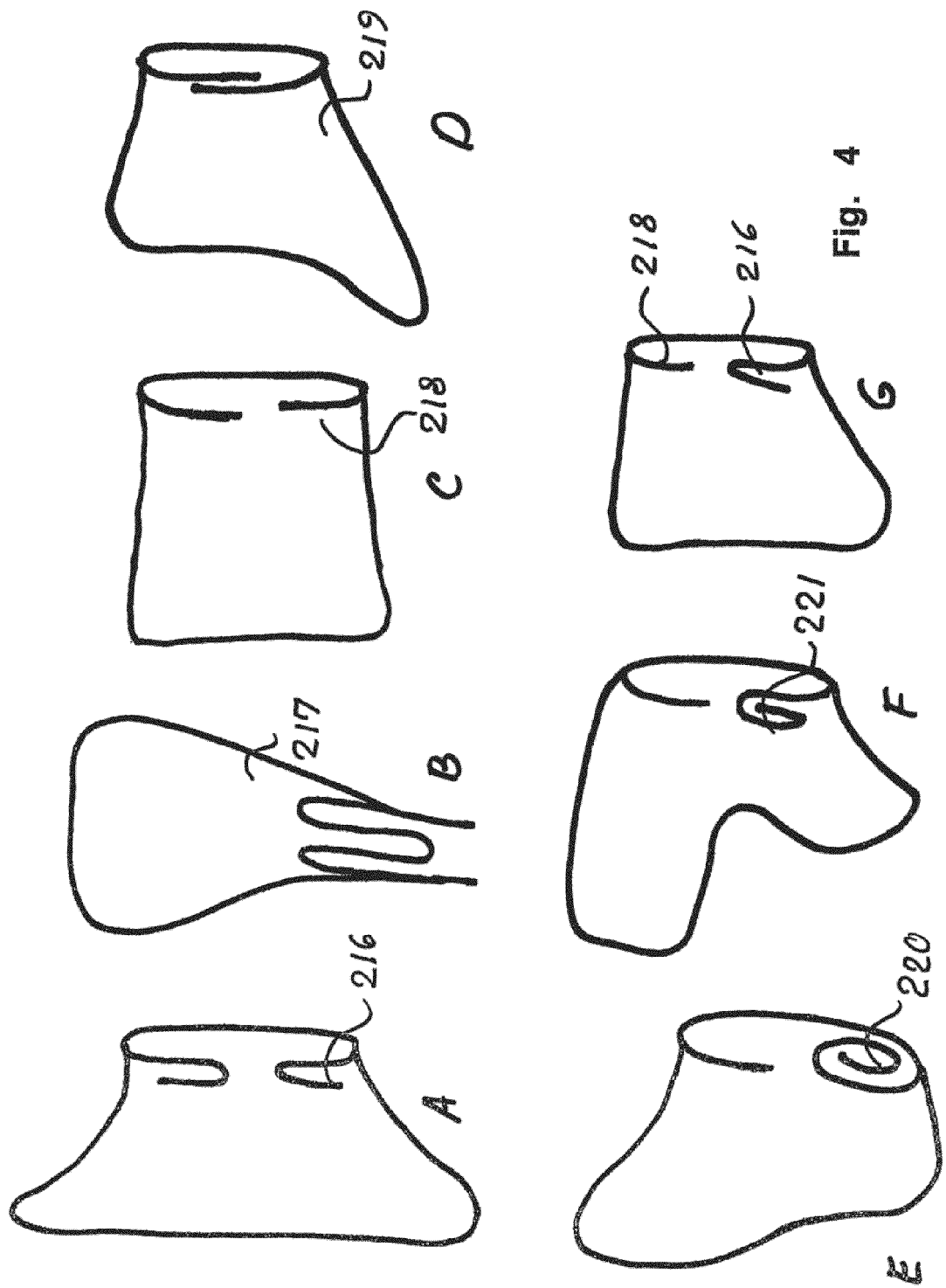
FIG. 4 shows, in schematic diagrams A to G, different embodiments of folds for an airbag of an airbag system of the invention.

Additional folds for selective modification of the spreading of the airbag 214 are shown in FIG. 4. The embodiment A with "double" 180° folds produces a targeted quick spreading of the airbag 214 upward and downward. The embodiment B shows a reverse fold 217, here as an upward-targeted fold. The embodiment C with a 180° fold 218 forces quick deployment forward. The embodiment D shows a 180° fold 218 with forced first deployment 219 of the lower bag 202. In the embodiment E, the upper bag is deployed quickly forward; the lower part is delayed by a rolling fold 220 and forced "inward" toward the horizontal deployment by the rolling fold. The embodiment F shows a lower reverse rolling fold outward; as rolling fold 221, this leads to a delay and to a deployment of the airbag 214 downward through its winding direction. The embodiment G shows at the bottom a 180° double fold 216 and thus a moderate, quick deployment targeted downward. In summary, these examples show how the deployment direction and velocity can be specified by the type of fold.

FIG. 2 shows an entire airbag 202 that is folded according to the representation shown. This embodiment causes the entire airbag 202 to be discharged forward and the tear strip loop 203 to be activated. The kinks 204 [sic; 210] of the airbag 202 at the top and bottom prevent spreading of the gas upward or downward.

Figure 5:
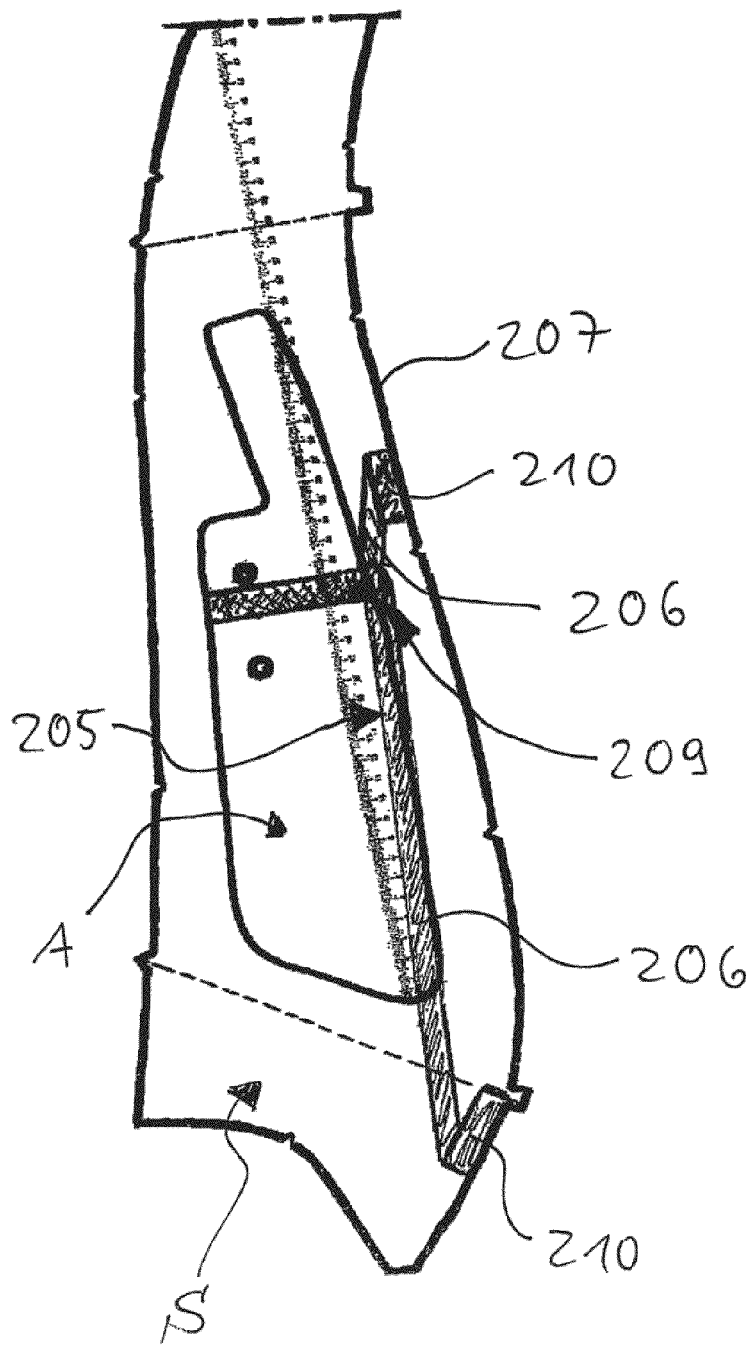
FIG. 5 shows, in a schematic side view, an embodiment of a backrest part of a vehicle seat with an airbag system of the invention.

In a schematic side view, FIG. 5 shows an embodiment example of a backrest part of a vehicle seat with an airbag system of the invention.

Indeed, in the preceding embodiment examples, reference has been made to an opening technique that can tear the airbag tear seam of a seat covering at two separate points, but the present invention is not limited to this implementation. Instead, an arbitrary plurality of tear points determined according to other conditions and requirements could be provided and strips or strip ends could be provided.

Thus, the invention devises an airbag system, a vehicle seat, and a deployment method for this airbag system, with an opening technique for the airbag tear seam of a seat covering for the airbag that is housed so that it cannot be seen under the covering. The opening technique is realized such that the force of deployment of the airbag tears a hole or holes in the tear seam, wherein this hole or these holes creates/create a slight opening in the seam according to the physics of a "run." Furthermore, the opening technique is configured such that a strip or several strips or strip ends sewn into the airbag tear seam of the seat covering is or are torn from the seam due to the force of deployment of the airbag. In particular, in this opening technique, the strip end or the strip ends can be one side of a loop that is placed around the airbag module. The specific embodiment created in this implementation could tear, for example, two holes in the strip sewn at two places, which is especially advantageous for a so-called "double" pelvis-thorax bag. The strip/strips is/are thus sewn according to the invention at more than one point, so that the seat covering tears at correspondingly several, for example, two, separate points and the airbag can be discharged safely and in a targeted way. The beginning of deployment can be influenced through the positioning of the tear strip/tear strips. Different material expansions have no effect on the functional reliability of the airbag system (greater expansion is more economical and is easier to process).

The strip loop could be provided at the end with a sliding ring through which the strip to be torn or the strip ends to be torn is/are passed. Preferably, the strip end is or the strip ends are positioned so that the strip end/strip ends is/are "peeled away," which requires less force than that required for "clean break" tearing.

Furthermore, the airbag fold is or the airbag folds are configured so that the force of the first deployment is tailored to the opening of the tear strip. Here, it is further preferred that the airbag fold or the airbag folds be configured so that, in addition, a target deployment direction and velocity are achieved.

The implementations according to the invention lead to a series of advantages.

Today, the airbag tear seam is typically weakened and therefore must be continuously monitored, in order to guarantee a balance between strength during use and easy opening. This is required because the bag must simultaneously open many stitches. Furthermore, the surroundings of the tear seam are reinforced with a sleeve to eliminate the expansion of the covering material. The implementation of the tear strip technique according to the invention requires a tear seam that has not been weakened or that has been weakened only slightly, because the airbag must tear only a few stitches according to the system. The material need not be reinforced because the strip loop performs the tearing process in the direction opposite to airbag deployment. Furthermore, the airbag discharge point could be affected by the sewing point (s). Selective folding of the airbag further supports the tear strip technique and simultaneously the deployment direction and velocity.

The invention is especially advantageous for the design of airbag systems with a greater height than previous systems. This relates, in particular, to two-part airbags or so-called two-chamber or two-zone airbags or, in general, multiple-part airbag constructions.

Figure 6:
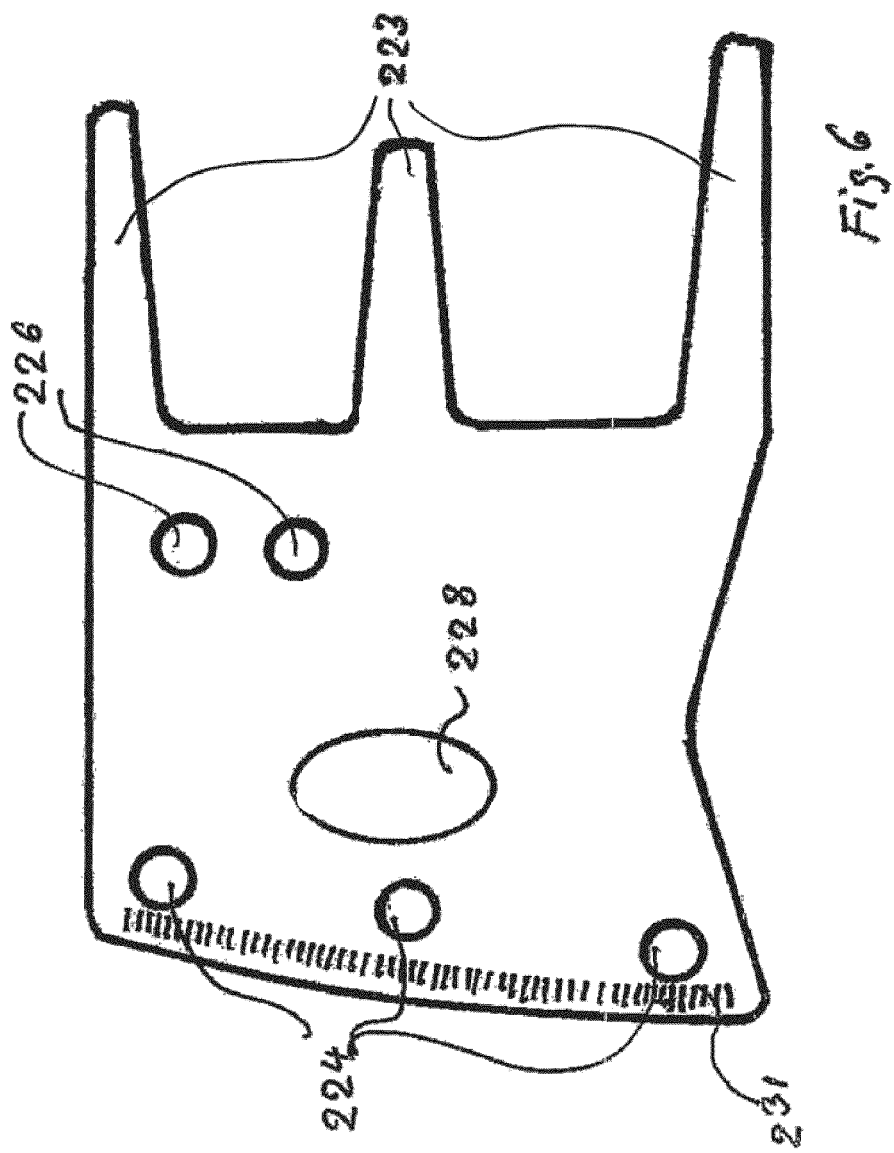
FIG. 6 shows, in a schematic view, a detail of another embodiment of an airbag system of the invention.

Another alternative of the tear strip technique is a fabric 222 as shown in FIG. 6. This fabric 222 is cut so that three tear strips 223 are formed on one side. Here, three tear strips are shown. It could also be another number, beginning with 1. This depends on the design of the airbag 214 and the type of seat covering 207.

Figure 7:
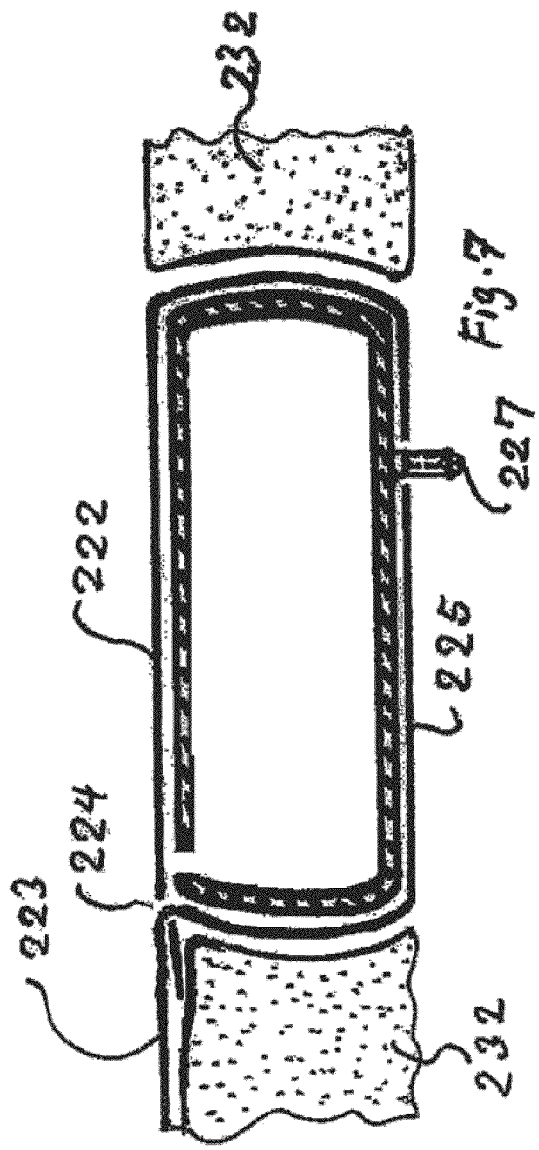
FIG. 7 shows, in a schematic view, a principal detail of the embodiment of an airbag system according to FIG. 6.

On the opposite side of the fabric 222, in this example, three holes 224 are formed. The tear strips 223 are passed through these holes 224 and then sewn to the tear seam 208. In this so-to-speak "open" sleeve 225, the airbag module A is inserted and then pulled taut during assembly and thus brought into a predetermined position. An additional two holes 226 are used for the passage of screw bolts 227 of the airbag module A. This principle is shown in FIG. 7.

The advantage of this alternative is that an arbitrary number of tear strips 223 can be used without additional assembly costs. This is especially advantageous for multiple-part airbags 214. Furthermore, several weakened points of the tear seam permit a tighter seam. Several—and thus shorter—tear strips 223 separate earlier from the deploying airbag 214. Sleeves that are typically used today merely reinforce the seat covering and minimize its expansion. The sleeve 225 described here with its integrated tear strips tears holes into the tear seam 208 in the sense of runs. This requires only a small force and thus permits a significantly tighter airbag seam 208.

Figure 8:
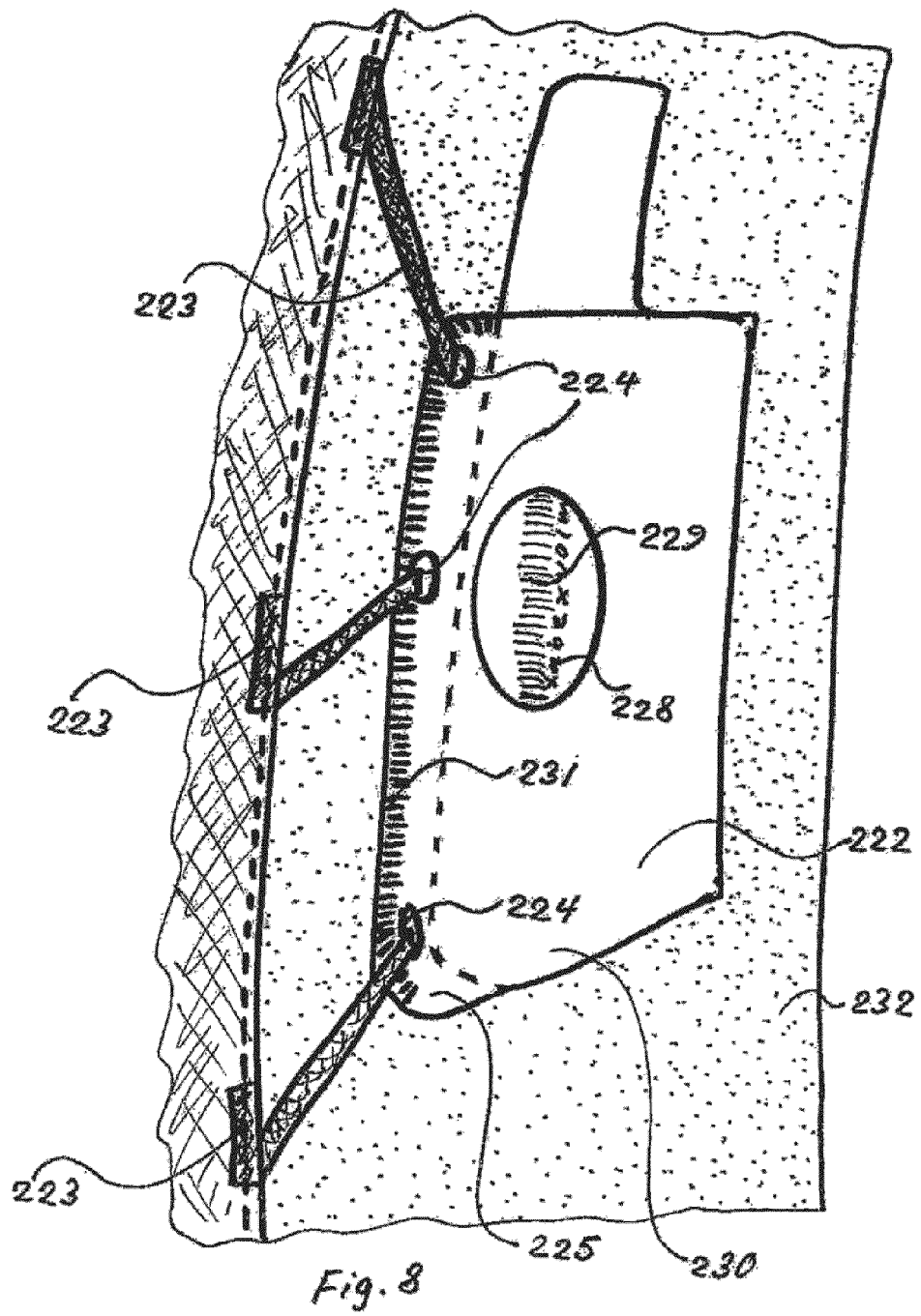
FIG. 8 shows, in a schematic and partially sectioned view, a detail of an alternative of the embodiment of an airbag system according to FIG. 6.

Furthermore, a viewing hole 228 is formed. Through this hole, a bar code 229 of the airbag module 230 can be read (see FIG. 8). Another bar code 231 is formed in front of the holes 224. This bar code 231 is covered partially at predetermined points of the tear strips 223 as shown in FIG. 8. The bar code 231 is inspected through the viewing hole 228 at the same time as the inspection of the bar code 229 of the airbag module 230. The predetermined points of the bar code 231 must be covered by the tear strips in order to receive an OK inspection.

Figure 9:
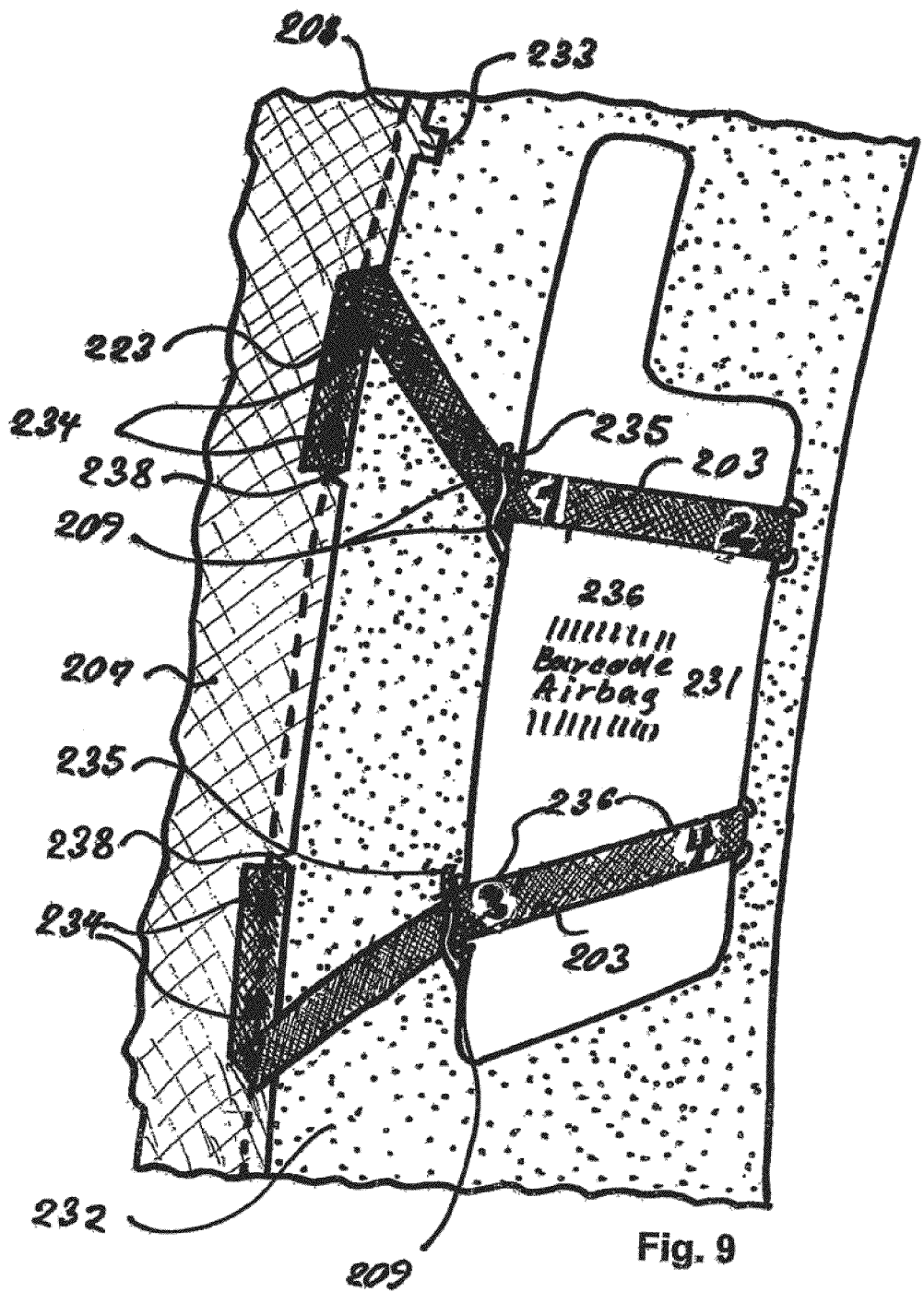
FIG. 9 shows, in a schematic and partially sectioned view, another embodiment of the airbag system.

FIG. 9 shows another application of the tear strip technique with two tear strips 235 that are positioned exactly in tear strip loops 203 around the airbag module 230. For this purpose, the direction change rings 209 are pushed from above into injection-molded clamps 235 that are open on one side. A suspension point 237 is also injection-molded on the opposite side of the airbag module 230. When the tear strip loops 203 are correctly positioned, the positioning markings 236 (in this case the numbers 1, 2, 3, 4) are also in a predetermined position. This position is checked by a photoscanner (not shown) after the assembly of the airbag module 230 on the seatback frame at the same time as the bar code 231 of the airbag module 230.

FIG. 9 further shows that the sewing of the tear strips 237 [sic; 235] at the correct position of the seat covering 207 is guaranteed. Here, the seat covering 207 is provided with a reference point 233. A computer-controlled sewing machine that is equipped with detectors for contours and light-dark areas moves from this reference point 233 to the first (dark) fixing point 234. Only when this machine is located at the correct position does it move to the next fixing point, etc. Then the angle position of the tear strip 223 is also detected. The sewing itself is seen at the sewing position of the tear strips 223 at small, V-shaped notches 238. The sewing machine is also configured so that it can only sew forward.

In summary, the present invention relates, in particular, to an airbag system and especially to an opening system for airbags that are discharged from a sewn cover. The opening technique according to the invention for a seat covering is advantageous for the selective, quick, and problem-free passage of an airbag. A strip is placed as a loop around an airbag. Deployment of the bag enlarges the loop and tears, with the strip sewn in the airbag tear seam, a hole or a run in the seam and, indeed, according to the invention, at more than one point. Through this weakening, the seam is opened by the bag in a selective way with little force. The specific configuration shown here can tear two holes, for example, in the strip sewn at two points, which is especially advantageous for a so-called "double" pelvis-thorax bag. Furthermore, airbag fold systems are shown that support this process and that support a desired fold direction and fold velocity.

The invention is described with reference to embodiments in the description and in the drawing merely using examples and is not limited to these embodiments, but instead comprises all variations, modifications, substitutions, and combinations that someone skilled in the art can take from the present documents, especially within the scope of the claims and the general representations in the introduction of this description, as well as from the description of the embodiments and their representations in the drawing and can be combined with the technical knowledge of someone skilled in the art and also with the state of the art. In particular, all of the individual features and possible implementations of the invention and their variants could be combined.

Explanation of Symbols
201 Two-chamber bag
202 Lower bag
203 Tear strip loop
204 Container
205 Strip
206 Leg
207 Seat covering
208 Tear seam
209 Direction change ring
210 Bend
211 Sewing
212 Strip ends
213 Fold
214 Airbag
215 Base fold
216 Double 180° fold
217 Reverse fold
218 180° fold
219 Forced first deployment
220 Rolling fold
221 Reverse rolling fold
222 Fabric
223 Tear strips
224 Holes
225 Sleeve
226 Holes
227 Screw bolt
228 Viewing hole
229 Bar code
230 Airbag module
231 Barcode
232 Seat cushion
233 Reference point
234 Fixing points
235 Clamp
236 Position markings
237 Hanging points
238 V-shaped notches
A Airbag module
S Seat

The invention claimed is:

1. An airbag system, comprising:
an airbag module;
a seat covering for the airbag that is configured to cover the airbag, the covering including a seam proximate the airbag;
at least one first strip, each of said at least one first strip having at least a portion extending over an expandable side of the airbag;
second and third strips, each attached to one of said at least one first strip at a first end, and attached along a length of said seam along a second end, thereby configured to progressively tear a hole or holes along the length of the tear seam when said second and third strips are pulled by said at least one first strip when said at least one first strip is pulled by the force of a deployment of the airbag, thereby facilitating expansion of said airbag past said covering.

2. The airbag system according to claim 1, wherein the second and third strip ends are sewn into the seam.

3. The airbag system according to claim 1, wherein the airbag has two chambers and is configured to be discharged past the covering at two or more separate points when the airbag system is deployed.

4. The airbag system according to claim 1, wherein the first strip forms a loop around at least a portion of the airbag.

5. The airbag system according to claim 1, the first strip end provided with a sliding ring through which the first ends of the second and third strips are passed.

6. The airbag system according to claim 1, wherein the second and third strips are attached by folding and sewing the second ends into the tear seam so that the second ends progressively peel away from the tear stream by tearing successive stitches of the tear seam.

7. The airbag system according to claim 1, wherein the airbag folds are configured to open the tear strip during a first portion of the airbag deployment.

8. The airbag system according to claim 7, wherein the airbag folds are configured so that a target deployment direction and velocity is achieved.

9. The airbag system according to claim 1, characterized in that said first tear strip extends from a sleeve placed around the airbag module, one side of the sleeve cut to form said first tear strip.

10. The airbag system according to claim 9, wherein a hole is formed on the opposite side of the open sleeve the first tear strip passed through the hole.

11. The airbag system according to claim 1, wherein each of the second and third tear strips are sewn together with the covering tear seam.

12. The airbag system according to claim 1, wherein during the deployment of the airbag, the second and third tear strips progressively tear stitches of the tear seam to enable the tear seam to be torn using a lower force relative to tearing multiple stitches simultaneously.

13. The airbag system according to claim 1, wherein at least one of the first, second, and third tear strips are provided with markings that can be identified to cause the correct positioning of the tear strips.

14. The airbag according to claim 1, wherein at least one of the first, second, and third tear strips are provided with markings that can be identified, using a photoscanner, to cause the correct positioning of the strips.

15. A vehicle seat, comprising:
a vehicle seat;
an airbag system according to claim 1.

16. An airbag system, comprising:
an airbag expandable to define an expanding direction;
a cover material provided over the airbag proximate the expanding direction, the cover material sewn shut at a tear seam;
a first tear strip secured to pass over a portion of the airbag across the expanding direction;
second and third tear strips each having a first end attached to spaced apart locations, respectively, along a longitudinal length of the tear seam, and each having a second end attached in sliding engagement to an end of said first tear strip, a force of a deployment of the airbag thereby operative to forcibly press the airbag against the first tear strip thereby pulling the second and third tear strips along the tear seam to thereby weaken the tear seam about at least two locations to facilitate the deployment of the airbag past the cover material.

17. The airbag system of claim 16, wherein the first tear strip is looped around the airbag.

18. The airbag system of claim 16, wherein the second and third tear strips are slidably connected to a loop, the loop connected to the first tear strip.

19. An airbag system comprising:
an airbag;
a cover material provided over the airbag to conceal the airbag, the cover material including a seam proximate the airbag;

a sheet wrapped about at least a portion of the airbag, the sheet forming first and second edges disposed over an expandable portion of the airbag, the first edge shaped to form at least one first strip having a first strip end, the second edge shaped to form at least one aperture through which the first strip end is passable; the first strip end passed through an aperture, and sewn along a length of the cover material seam, the sleeve operable thereby to guide and pull the at least one strip when the airbag is inflated, to thereby pull the strip to sequentially tear the cover material seam to admit the expanding airbag to expand past the cover material.

20. The airbag system of claim 19, wherein during the deployment of the airbag, the second and third tear strips progressively tear stitches of the tear seam, to enable the tear seam to be torn using a lower force relative to tearing multiple stitches simultaneously.

\* \* \* \* \*